United States Patent [19]
Berkey

[11] Patent Number: 5,152,816
[45] Date of Patent: Oct. 6, 1992

[54] METHOD OF ENLARGING END OF CAPILLARY TUBE BORE

[75] Inventor: George E. Berkey, Pine City, N.Y.

[73] Assignee: Corning Incorporated, Corning, N.Y.

[21] Appl. No.: 422,236

[22] Filed: Oct. 16, 1989

[51] Int. Cl.$^5$ .............................................. C03B 37/10
[52] U.S. Cl. .............................. 65/3.15; 65/31; 65/108; 65/109; 65/DIG. 9; 156/646; 156/663
[58] Field of Search .................. 65/31, 3.15, 108, 109, 65/DIG. 9, DIG. 16; 156/646, 663, 654

[56] References Cited

U.S. PATENT DOCUMENTS 4,415,404  11/1983  Riegl ................................... 156/635

FOREIGN PATENT DOCUMENTS 2084988  4/1982  United Kingdom ......... 65/DIG. 16
2122599  1/1984  United Kingdom ................ 65/3.15
1213900  7/1984  United Kingdom .

Primary Examiner—W. Gary Jones
Assistant Examiner—Todd J. Burns
Attorney, Agent, or Firm—William J. Simmons, Jr.

[57] ABSTRACT

A method of forming a tapered aperture at the end of a capillary tube bore. A gaseous etchant such as a fluorine-containing compound flows through the bore and emanates from the first end of the tube. That tube end is heated to create a longitudinal temperature gradient. The gaseous etchant reacts with the tube and enlarges that portion of the bore at the first end. The resultant tapered aperture has a surface smoothness and shape that greatly facilitates the insertion of optical fibers during the fabrication of optical energy transfer devices.

12 Claims, 2 Drawing Sheets

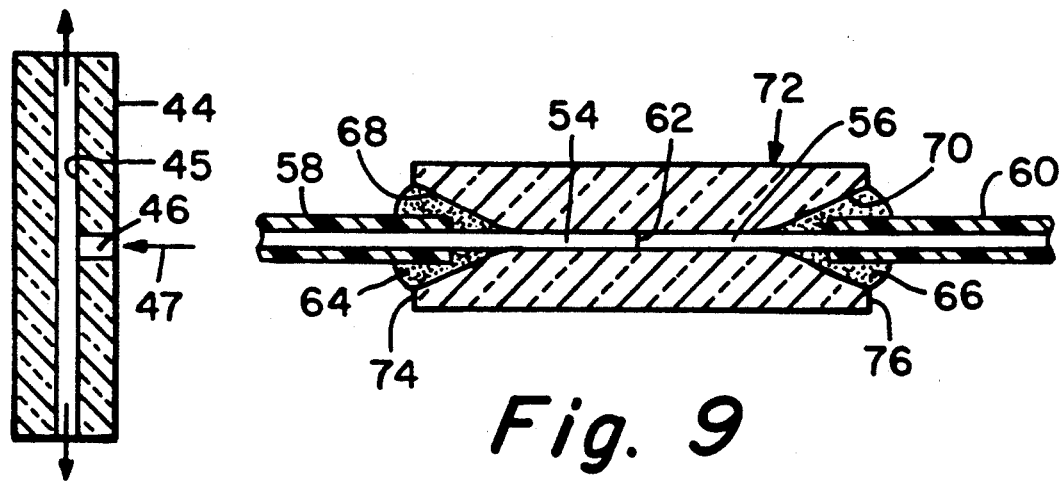
Fig. 7
Fig. 9
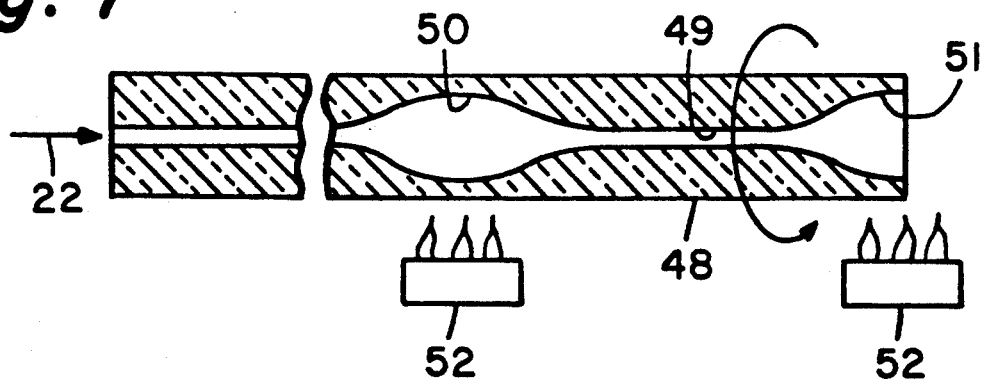
Fig. 8

METHOD OF ENLARGING END OF CAPILLARY TUBE BORE

BACKGROUND OF THE INVENTION

The present invention relates to a method of making funnel-like tapered apertures at the ends of a capillary tube bore, and more particularly, to a method of making capillary tube splices and couplers for optical fibers.

Optical fibers have a core surrounded by a cladding having a refractive index lower than that of the core. Optical fiber systems employ various types of optical energy transfer devices that connect or couple energy between such fibers. As used herein, the term "optical energy transfer device" refers to devices for coupling energy between fibers that are disposed in orientations such as end-to-end, side-by-side, and the like.

The end-to-end connection of two optical fibers requires precise axial alignment of the fibers to minimize insertion loss. Due to the relatively large core size of multimode fibers, axial alignment of the cores of such fibers has been accomplished without too much difficulty. However, it is very difficult to axially align the cores of single-mode fibers the core diameters of which are typically between 7 and 12 $\mu$m.

The technique usually employed for connecting two fibers in end-to-end axial alignment requires a precision centering device such as a connector ferrule or a lead-in ferrule for aligning the adjacent endfaces of the two fibers. Such centering devices may consist of capillary tubes formed of glass, ceramic, gemstone, metal, plastic or the like. To be suitable for the alignment of single-mode fibers, the capillary tube must have a precision bore the diameter of which is no more than a few microns larger than the fibers that are to be aligned. In one type of centering device, each fiber extends through the bore of a ferrule such that its endface is flush with the ferrule endface; alignment of the two ferrules brings the fibers into axial alignment. Another type of centering device requires the partial insertion of one fiber into a ferrule bore where it abuts the fiber to which it is to be connected. Since the ferrule bores are only slightly larger in diameter than an optical fiber, they have been provided with enlarged, tapered apertures to facilitate insertion of the fibers.

Couplers of the type disclosed in European patent application No. 0302745, published Feb. 8, 1989, rely on the evanescent coupling of optical energy between fibers. A preliminary step in the formation of one coupler of this type requires that two or more optical fibers be inserted into a coupler tube having a bore that is preferably just large enough to accommodate the fibers in side-by-side relationship. The tube is collapsed onto the fibers, and the tube midsection is stretched to reduce the diameters of the fiber cores and to reduce the spacing between the cores. A tight fit between fibers and tube during the preliminary assembly step keeps the fibers in proper alignment during subsequent processing steps. A tapered aperture at the end of the tube bore also facilitates the manufacture of this type of device.

Various techniques have been used to form the tapered apertures, depending on the type of material used. Glass, which is a particularly suitable ferrule material, is not easily molded or machined to form apertures having tapered end portions. Good tapered apertures can be obtained by a particle bombardment technique, but relatively costly equipment is required to practice that method.

Apertures having well shaped enlarged ends can be made by directing a flame onto a glass capillary tube at spaced intervals while the bore is pressurized, and severing the tube at the center of each bubble. That method may result in the enlargement of the outside diameter of the tube, a feature that is disadvantageous for certain uses.

SUMMARY OF THE INVENTION

It is therefore an object of the present invention to provide an improved method of forming an enlarged tapered aperture at the end of a capillary tube. A further object is to provide a method that will overcome the heretofore noted disadvantages of prior art methods. Another object is to provide a method of forming an enlarged, smooth funnel-shaped end for a capillary tube bore, a gradual transition existing between the bore and enlarged end. A further object is to provide an improved method of forming an optical fiber splice, coupler or similar optical energy transfer device.

Briefly, the present invention relates to a method of forming a tapered aperture at the end of a bore that extends longitudinally through a capillary tube. A gaseous etchant is flowed through the tube bore and emanates therefrom at the first end of the tube. The first end of the tube is heated, and the steps of flowing and heating are continued for a sufficient length of time to permit the gaseous etchant to react with the tube and enlarge that portion of the bore at the first end.

The gaseous etchant may be a compound which fractionates to release an active constituent which reacts with the tube material. As the gaseous etchant flows through the tube midregion, the temperature thereof is not yet at the fractionation temperature. However, the gaseous etchant reaches the fractionation temperature when it reaches the tube end region that is subjected to a heat source. The gaseous etchant may comprise a fluorine-containing gas that fractionates and releases fluorine radicals at temperatures to which it is subjected within the tube end region.

The maximum temperature may occur at the first end of the tube, or within the end region at an axial position remote from the first end of the tube. The temperature gradient may be such that the greatest enlargement of the tapered aperture occurs at the first end of the tube or within the end region at an axial position remote from the first end of the tube.

The step of heating advantageously consists of heating the tube uniformly about its longitudinal axis. This can be accomplished by such techniques as rotating the tube about its longitudinal axis, directing heat axially toward the first end of the tube, using ring burners, and the like.

The surface smoothness, shape and transition to the remainder of the tube bore greatly facilitate the insertion of optical fibers during the fabrication of optical energy transfer devices. In general, a tube produced from the above-described method can be employed to form an optical energy transfer device by inserting into the tapered aperture at least one optical fiber, and applying bonding material to the optical fiber and to the tapered aperture to secure the fiber to the tube.

BRIEF DESCRIPTION OF THE DRAWINGS

FIG. 7 is a cross-sectional view of a modified capillary tube which may be used in the present method.

FIG. 8 is a cross-sectional view of a further embodiment of the present method.

FIG. 9 is a cross-sectional view of a pair of fibers connected together by a splice tube formed in accordance with the method of the present invention.

DESCRIPTION OF THE PREFERRED EMBODIMENTS

The drawings are not intended to indicate scale or relative proportions of the elements shown therein.

Figure 1:
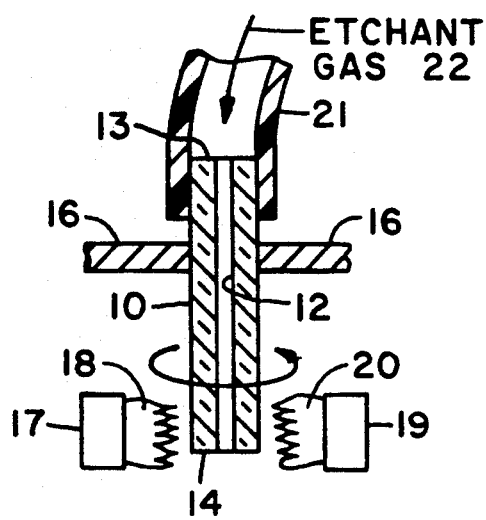
FIG. 1 is a schematic cross-sectional view of apparatus for forming an enlarged, tapered aperture in a capillary tube.
Figure 2:
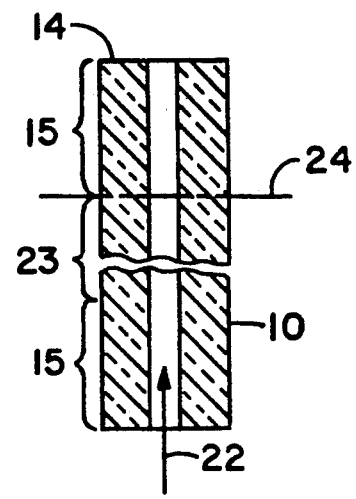
FIG. 2 is a side elevational view of a capillary tube wherein the etchant fractionation temperature plane is illustrated.

Tube 10 of FIG. 1 has a longitudinal aperture or bore 12 extending between ends 13 and 14. For purposes of describing the method of the invention, tube 10 is divided into three axial regions, two end regions 15 and midregion 23 (FIG. 2). For optical fiber connecting and coupling applications, tube 10 is preferably a precision capillary tube, i.e. it's bore diameter is controlled to tight tolerances. For certain applications, the bore cross-sectional shape is circular; for other applications, it may be shaped like a regular polygon, a diamond or the like. A longitudinal slot may extend along the bore to prevent a pistoning effect. The present method can be employed even when the capillary tube aperture is not located on the longitudinal axis of the tube.

The tube can be formed of any material which can be suitably removed by selective gas phase etching. The composition of tube 10 also depends on the particular kind of resultant device that is to be formed. Although glass is preferred for the end-to-end alignment of optical fibers, it is thought that other materials such as certain ceramics and glass-ceramics and metals could also be used. If the tube is to be formed of glass, for example, it could be a relatively hard glass such as pure silica or a softer glass such as $SiO_2$ doped with an oxide of lead, boron or the like. The refractive index of the capillary tube is immaterial for this type of connector. If the tube is to be used to form a side-to-side coupler of the type wherein two or more optical fibers are inserted into the bore and the tube is thereafter collapsed and stretched, the softening point temperature of tube 10 should be lower than that of the fibers that are to be inserted therein. Suitable tube compositions for this latter mentioned use are $SiO_2$ doped with $B_2O_3$, fluorine and combinations thereof. In addition to lowering the softening point temperature of $SiO_2$, $B_2O_3$ and fluorine also advantageously decrease the refractive index thereof.

Tube 10 is mounted in a suitable apparatus such as vise 16, which positions end 14 adjacent a source of heat such as burners 17 and 19, flames 18 and 20 of which are directed toward the tube. When heat is directed toward the side of tube 10, it should be applied uniformly around the tube to prevent preferential etching of one side of the tube bore. This effect can be achieved by using a plurality of burners or a ring burner, by rotating the tube about its longitudinal axis (see arrow 11), or by rotating the flame about the tube. If the heat is directed axially onto the end of the tube, a single burner can be used, and means for providing relative movement between the burner and tube is unnecessary.

Means such as supply tube 21 is connected to end 13 for introducing an etchant into bore 12. Tube 21 can be formed of an elastic plastic material such as silicone. The specific etchant to be employed depends upon the material from which tube 10 is formed. Fluorine containing gas phase etchants are particularly suitable for etching high silica content glasses, which are a preferred material for making tubes that are to be used in optical fiber connectors and couplers. The compounds $SF_6$, $NF_3$ and $C_2F_6$ are examples of fluorine-containing gas phase etchants which are essentially inert at room temperature. These gases fractionate and produce fluorine radicals at that portion of the tube where the temperature has been increased a sufficient amount by the heat source. These fluorine radicals are extremely effective for etching silica-based glasses at temperatures above 500° C. The temperature of the tube should not be increased to such an extent that the tube begins to deform. The gas $SF_6$ requires temperatures of about 1200° C. to obtain reasonable fractionation. This gas could be used for etching enlarged apertures in a pure silica tube, but the high temperature required for that gas would tend to deform softer glasses such as those containing $B_2O_3$. To process such softer glasses, a gas such as $NF_3$ is preferred, since it begins to fractionate at about 500° C.

Figures 3, 4:
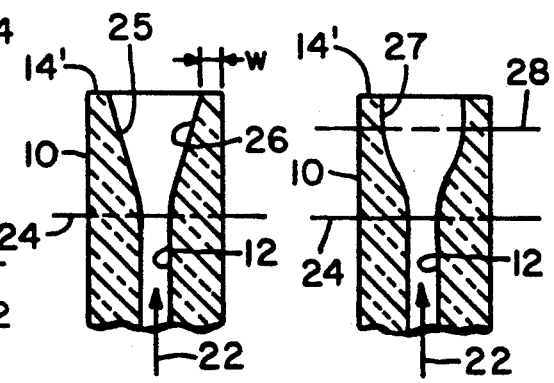
FIG. 3 is a partial cross-sectional view of a capillary tube illustrating a tapered surface that can result from the method of the invention.
FIG. 4 is a partial cross-sectional view of a capillary tube illustrating a modified tapered surface.

The location and temperature of the heat source is such that the end portion of tube 10 at which the heat is directed is subjected to a predetermined temperature gradient. A region of the tube defined by plane 24 (FIG. 2) is heated to a temperature $T_f$, the fractionation temperature at which the gas begins to release fluorine radicals. The temperature $T_f$ depends upon the particular gas. The temperature of the tube increases beyond plane 24 toward end 14. The temperature of the gas flowing through aperture 12 is not elevated to $T_f$ until the gas reaches plane 24. Little etching is done by the gaseous etchant at plane 24 since only a small percentage of the fluorine radicals have been released therefrom. As shown in FIG. 3, the amount of etching increases with increasing distance beyond plane 24, because a larger percentage of the fluorine radicals have been released from the gaseous etchant and since those radicals that have been released are more reactive at the increased temperature of the gas between plane 24 and end 14.

Etching is continued until the enlargement of the end of bore 12 has achieved the the desired maximum radial dimension. If the highest tube temperature occurs at end 14, a continuously flaring taper 25 can be formed. As shown in FIG. 3 a gradual transition region 26 can be achieved between bore 12 and tapered region 25.

Various process parameters can be varied to change the time required to reach a predetermined depth and to change the shape of the tapered aperture. Such parameters are (a) the angular orientation of the burner and flame with respect to the tube axis, (b) the spacing between the heat source and the tube, (c) the temperature of the heat source, (d) the etchant employed (the concentration and fractionation temperature thereof, and (e) etchant flow rate.

The occurrence of a temperature maximum at a plane 28 that is removed from end 14 (FIG. 4), can result in the formation of a bulbous bore enlargement 27, the diameter of which is greater at plane 28 than at end 14. An advantage of this shape is that it aids in the retention of glue; it is therefore effective for securing optical fibers to tube 10.

Forming a tapered aperture by the method of the present invention provides a fast, cost effective process that is easily automated for mass production. This method does not deform the outside diameter of the tube. It also allows the radial width w (FIG. 3) of the remaining annular portion 14' of the tube endface to be controlled to an extent sufficient to ensure that the resultant tube possesses adequate strength. It is obvious that the resultant tube would be weakened if width w were so small that the tapered aperture ended in a sharp surface.

Figure 5:
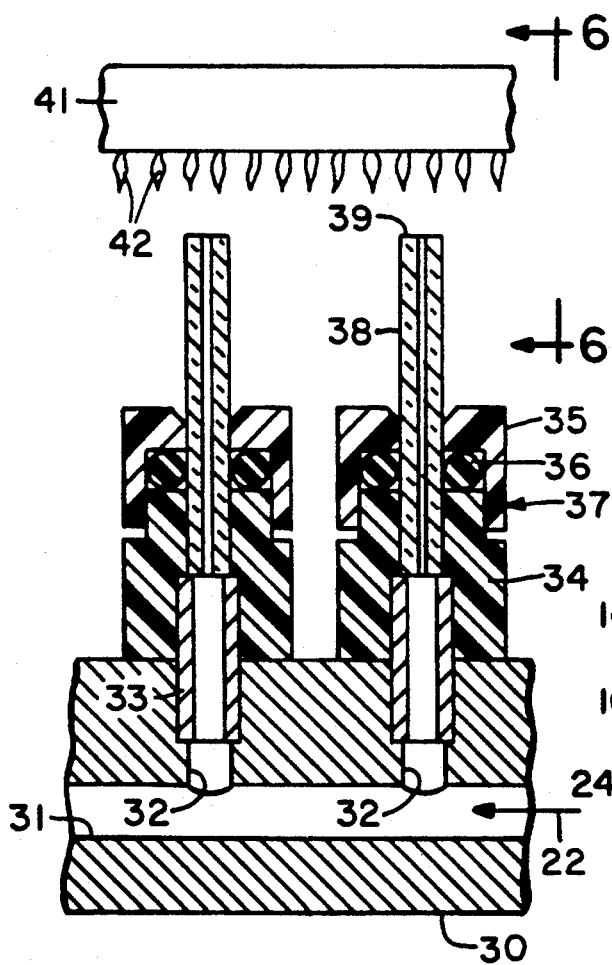
FIG. 5 is partial cross-sectional view illustrating apparatus for simultaneously forming tapered apertures in a plurality of capillary tubes.
Figure 6:
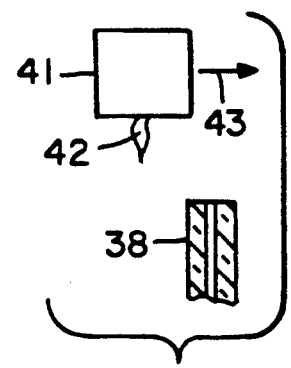
FIG. 6 is a partial cross-sectional view illustrating the operation of the apparatus illustrated in FIG. 5.

The apparatus shown in FIGS. 5 and 6 can be employed to simultaneously form tapered apertures in a plurality of glass capillary tubes. Manifold 30 is provided with a main gas supply bore 31 and a plurality of distribution bores 32. Each bore 32 has an enlarged end in which there is situated a metallic tube 33 which protrudes above the surface of the manifold. Disposed over each tube 33 is a plastic tube 34 on which there is a collar 35 which secures an O-ring 36. The combination of elements 33 through 36 constitutes capillary tube support device 37.

A glass capillary tube 38 is inserted through each collar 35 and into the respective tube 34 until it becomes seated on tube 33. The top endface 39 of each tube 38 is thus situated a predetermined distance from a movable ribbon burner 41. The O-rings seal capillary tubes 38 to tubes 34 so that the gaseous etchant cannot escape around the outside surfaces of tubes 38.

The process can be automated, the flow of gaseous etchant to bore 31 and the flow of gas and oxygen to burner 41 being controlled by electrically controlled valves. The movement of burner 41 between its position above tubes 38 and a retracted position away from the tubes 38 can also be controlled by electrical means. The sequence of operation is as follows. Burner 41 is ignited. Gaseous etchant begins to flow, and burner 41 is moved in the direction of arrow 43 of FIG. 6 to a position directly above tubes 38. The end region of tube 38 is subjected to a temperature gradient, the maximum temperature of which is at end 39, since flames 42 are directed axially thereon. After a predetermined time period, burner 41 is retracted, whereby the etching stops. The predetermined time period is selected so that the temperature and the kind and amount of gaseous etchant results in the formation of the desired tapered aperture.

As shown in FIG. 7, a splice tube 44 can be provided with a radial bore 46 from which excess glue can flow as the fibers are inserted into the ends of longitudinal bore 45. Tapered apertures can be simultaneously formed at both ends of bore 45 by flowing gaseous etchant (arrow 22) into bore 45 and simultaneously heating both ends of tube 44 as the etchant flows therefrom.

A plurality of tubes having tapered apertures can be formed by the method illustrated in FIG. 8. Gaseous etchant 22 is flowed into one end of elongated capillary tube 48. The tube is heated at spaced points along the length thereof by burners 52. A cavity 50 is etched at each heated region of the tube. It is preferred that only one region be heated at any given time so that the gaseous etchant forming the cavity has a predetermined constant concentration. Tapered aperture 51 is formed at the end of the tube as described above. The spacing between cavities 50 is the same as the desired length of the resultant tube. After all of the cavities 50 have been formed, tube 48 is scored at the center of each cavity and then severed to form the individual tubes. Each tapered aperture can be made to resemble tapered aperture 26 of FIG. 3 by controlling the temperature gradient along the tube such that the highest temperature occurs at the center of the heated region.

The reaction products flow through the remainder of tube 48 and leave a powdery residue downstream from each cavity. This residue can be removed by flowing through the tube a suitable cleaning agent such as a weak solution of HF. The cleaning step can be performed before or after the individual tubes are severed.

The apparatus of FIG. 5 was employed to simultaneously enlarge the aperture ends of twelve capillary tubes. Each of the tubes was adapted to receive in side-by-side disposition two 125 $\mu$m outside diameter optical fibers that were to be fused and stretched. The apparatus consisted of a manifold 30 to which twelve tube support devices 37 were attached. Each tube support device 37 consisted of a stainless steel tube 33, a polyethylene tube 34, a polyethylene collar 35 and an O-ring 36. Oxygen and $CH_4$ were supplied to ribbon burner 41 at rates of 2.07 slpm and 0.56 slpm, respectively. The total flow rate of $NF_3$ to manifold bore 31 for the twelve tubes was 0.03 slpm.

Tubes 38 had the following dimensions: 2.8 mm outside diameter, 275 $\mu$m diameter circular axial bore, and 3.8 cm length. The tube composition was silica doped with about 6 wt. % $B_2O_3$ and between 1 and 2 wt. % fluorine. One of these tubes was placed in each of the twelve tube support devices 37. With the capillary tube in contact with the end of tube 33, the end 39 of each tube 38 was 0.75 cm from burner 41. While the $NF_3$ was flowing through the capillary tubes 38, burner 41 was actuated to position it immediately above the axes of tube 38. After 1 minute, burner 41 was retracted.

After the tubes cooled, they were inverted longitudinally, and the above-described process was repeated. The process formed at each end of the twelve tubes an enlarged tapered aperture of the shape illustrated in FIG. 3. The depth of each tapered aperture was about 1.5 mm to 2 mm. The diameter of each tapered aperture at tube end was about 1.5 mm.

Tubes formed by the process of the present invention can be utilized as follows to connect in end-to-end alignment two conventional 125 $\mu$m outside diameter single-mode optical fibers 54 and 56 (FIG. 9). A silica tube is collapsed onto a cylindrical carbon member having a longitudinal protrusion as taught in U.S. Pat. No. 4,750,926. The carbon member is burned out of the silica tube, which is thereafter drawn to reduce the diameter thereof. The resultant tube therefore has a longitudinal slot extending along the bore. If necessary, the outside diameter of the tube is increased by depositing glass particles on the outer surface of the tube and then heating the composite article to sinter or consolidate the particles. The resultant tube has an outside diameter of 2.5 mm and an axial bore diameter of 127

μm. The tube is scored at 2.54 cm intervals and then severed at each score line to produce individual tubes 72. The tube is provided with tapered apertures 68 and 70 at the ends thereof in accordance with the method of the invention.

Fibers 54 and 56 are conventionally surrounded by protective coating 58 and 60, respectively. Using a stripping tool, about 38 mm of coating is removed from the ends of the fibers, and any remaining coating material is cleaned from the fibers. The uncoated ends of the fibers are square cut to a length of about 12 mm. A dab of adhesive is placed at one end of the splice tube; capillary action causes it to flow through the entire tube. The uncoated end of fiber 54 is inserted into tapered aperture 68 and then into the bore of splice tube 72 so that its end is intermediate end surfaces 74 and 76. The smooth surface of the tapered aperture facilitates the fiber insertion process. The uncoated end of fiber 56 is inserted into tapered aperture 70 and into the longitudinal bore so that it is disposed with its end adjacent the end of fiber 54 as illustrated by numeral 62. With the fibers positioned as described, the coatings extend into the tapered apertures. Quantities 64 and 66 of adhesive, which are then disposed in apertures 68 and 70, respectively, affix the coated fibers to splice tube 72 and retain the fiber endfaces adjacent one another.

I claim:

1. A method of forming an enlarged tapered aperture in the bore of a capillary tube having a first end, a midregion and an end region between said first end and said midregion, said method comprising the steps of flowing through said bore a gaseous etchant the reactivity of which is proportional to temperature, said gaseous etchant flowing through said midregion prior to reaching said end region, and heating said end region to create a longitudinal temperature gradient therein, a portion of said tube in the vicinity of said first end being subjected to a maximum temperature, the temperature of said tube about the longitudinal axis thereof at any longitudinal position being substantially uniform, the steps of flowing and heating continuing for a sufficient length of time to permit said gaseous etchant to react with and etch that portion of said end region contacted by said etchant, thereby enlarging only that portion of said bore within said end region and forming a tapered aperture in said end region, a gradual transition existing between that portion of said bore within said midregion and the enlarged portion of said bore within said end region.

2. A method in accordance with claim 1 wherein the step of heating comprises rotating said tube about the longitudinal axis thereof.

3. A method in accordance with claim 1 wherein the step of heating comprises directing heat axially toward said first end of said tube.

4. A method in accordance with claim 1 wherein the step of heating comprises maintaining said tube stationary and directing heat axially toward said first end of said tube.

5. A method in accordance with claim 1 wherein the step of heating comprises heating said end region to a temperature that is sufficiently high that said gaseous etchant fractionates as it flows therethrough, the temperature of said midregion being below the fractionation temperature of said gaseous etchant.

6. A method in accordance with claim 5 wherein said maximum temperature occurs at said first end of said tube.

7. A method in accordance with claim 5 wherein said maximum temperature occurs within said end region at an axial position remote from said first end of said tube.

8. A method in accordance with claim 5 wherein said maximum temperature is such that the greatest enlargement of said tapered aperture occurs at said first end of said tube.

9. A method in accordance with claim 5 wherein said maximum temperature is such that the greatest enlargement of said tapered aperture occurs within said end region at an axial position remote from said first end of said tube.

10. A method in accordance with claim 1 wherein the step of flowing a gaseous etchant comprises flowing a gaseous compound which fractionates at a fractionation temperature to release an active constituent which reacts with the tube material.

11. A method in accordance with claim 10 wherein the step of flowing comprises flowing a fluorine-containing gaseous etchant that does not fractionate at the ambient temperature of the unheated portion of said tube, said gaseous etchant fractionating and releasing fluorine radicals at temperatures to which it is subjected within the heated region of said tube.

12. A method of forming a tapered aperture at an end of a capillary tube bore comprising the steps of providing a tube comprising first and second ends, a midregion and first and second end regions extending from said midregion to said first and second ends, respectively, flowing through said bore a gaseous etchant having a fractionation temperature, said gaseous etchant flowing from said midregion to at least said first end of said tube and emanating from said first end, the reactivity of said etchant being proportional to temperature, and heating said first end region to create a longitudinal temperature gradient therein, a portion of said tube in the vicinity of said first end being subjected to a maximum temperature, the temperature of said tube about the longitudinal axis thereof at any longitudinal position being substantially uniform, the portion of said gaseous etchant flowing through said first end region being subjected to a temperature at least as high as said fractionation temperature, and the portion of said gaseous etchant flowing through said midregion not being heated to said fractionation temperature, the steps of flowing and heating being continued for a sufficient length of time to permit said gaseous etchant to react with and etch that portion of said end region contacted by said etchant, thereby enlarging that portion of said bore within said first end region such that a gradual transition exists between that portion of said bore within said midregion and the enlarged portion of said bore within said end region.

* * * * *